US008807073B2

(12) United States Patent
Haas et al.

(10) Patent No.: US 8,807,073 B2
(45) Date of Patent: Aug. 19, 2014

(54) ROBOT ARRANGEMENT, IN PARTICULAR IN A PAINTING BOOTH

(75) Inventors: Jürgen Haas, Knittlingen (DE); Michael Baumann, Flein (DE); Stefan Esslinger, Steinheim-Hopfigheim (DE); Marcus Frey, Weil der Stadt (DE); Frank Herre, Oberriexingen (DE); Thomas Hezel, Asperg (DE); Alexander Meissner, Stuttgart (DE); Hans Schumacher, Schonaich (DE); Salvador Vergara, Brackenheim-Hausen (DE); Detlev Hannig, Winterbach (DE); Einar Endregaard, Rochester, MI (US); Richard Ostin, Farmington, MI (US); Andreas Schaal, Tubingen (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 363 days.

(21) Appl. No.: 13/254,942

(22) PCT Filed: Mar. 3, 2010

(86) PCT No.: PCT/EP2010/001327
§ 371 (c)(1),
(2), (4) Date: Apr. 4, 2012

(87) PCT Pub. No.: WO2010/099954
PCT Pub. Date: Sep. 10, 2010

(65) Prior Publication Data
US 2012/0191243 A1    Jul. 26, 2012

(30) Foreign Application Priority Data

Mar. 6, 2009 (DE) .......................... 10 2009 012 140

(51) Int. Cl.
| | |
|---|---|
| B05B 15/12 | (2006.01) |
| B05C 3/00 | (2006.01) |
| B05B 1/28 | (2006.01) |
| B25J 9/00 | (2006.01) |
| B05B 13/04 | (2006.01) |
| B25J 5/02 | (2006.01) |
| B25J 19/00 | (2006.01) |

(52) U.S. Cl.
CPC ....... *B25J 5/02* (2013.01); *B25J 9/0084* (2013.01); *B05B 13/0431* (2013.01); *B05B 15/1214* (2013.01); *B25J 19/0025* (2013.01)
USPC .......................................................... 118/323

(58) Field of Classification Search
USPC ................... 118/321, 323, 326, 309, 634, 50, 118/DIG. 7, 313–315, 324; 901/49; 454/50, 454/53, 55; 55/DIG. 46; 427/427.2
See application file for complete search history.

(56) References Cited

U.S. PATENT DOCUMENTS

| 4,630,567 A | 12/1986 | Bambousek |
| 2006/0081175 A1* | 4/2006 | Nagase .................. 118/220 |

(Continued)

FOREIGN PATENT DOCUMENTS

| DE | 2737777 | 12/1978 |
|---|---|---|
| DE | 69403130 T2 | 1/1998 |
| DE | 10149424 | 4/2002 |
| DE | 10155759 A1 | 5/2003 |
| DE | 102004040162 | 3/2006 |
| DE | 102004043697 | 3/2006 |
| DE | 102006032804 | 1/2008 |
| DE | 202007010812 U1 | 12/2008 |
| EP | 0084523 | 7/1983 |
| EP | 1609532 A1 | 12/2005 |
| JP | 1266870 A | 10/1989 |
| JP | 2303792 A | 12/1990 |
| WO | WO 2008/108401 A1 | 9/2008 |

OTHER PUBLICATIONS

International Search Report PCT/EP2010/001327, dated Sep. 14, 2010.

*Primary Examiner* — Yewebdar Tadesse
(74) *Attorney, Agent, or Firm* — Bejin VanOphem and Bienerman PLC (57) ABSTRACT

A robot arrangement, for example for a painting booth, and exemplary methods associated with the same, are disclosed. An exemplary robot arrangement may comprise a displacement rail, a plurality of robots, such as painting robots or handling robots, which can be displaced along the displacement rail, and a plurality of energy supply chains. The energy supply chains may supply one of the robots each, and may be associated with said robot, and each of the energy supply chains may run along the displacement rail in a particular track. The energy supply chains which are associated with the robots on the same displacement rail may run in discrete tracks.

19 Claims, 11 Drawing Sheets

(56) References Cited

U.S. PATENT DOCUMENTS

2008/0184932 A1* 8/2008 Albrecht et al. .............. 118/500
2009/0320753 A1* 12/2009 Yoshino et al. ............... 118/315
2010/0047465 A1* 2/2010 Ansorge et al. ............ 427/427.3
2010/0291310 A1 11/2010 Hartmann et al.
2011/0166708 A1* 7/2011 Herre et al. .................. 700/258

* cited by examiner

ROBOT ARRANGEMENT, IN PARTICULAR IN A PAINTING BOOTH

CROSS-REFERENCES TO RELATED APPLICATIONS

This application is a National Stage application which claims the benefit of International Application No. PCT/EP2010/001327 filed Mar. 3, 2010, which claims priority based on German Application No. 10 2009 012 140.4, filed Mar. 6, 2009, both of which are hereby incorporated by reference in their entirety.

BACKGROUND

The present disclosure relates to a robot arrangement, for example a robot arrangement in a paint cabin or paint booth.

Painting installations for painting motor vehicle body components are known, for example from EP 1 609 532 B1, in which the painting robots and handling robots (e.g. door opener, bonnet opener) are mounted on traversing rails such that they can be moved, the robots being supplied with the media required for operation (e.g. paint, solvent, propellant air, pulsed air, high voltage, etc.) by means of so-called energy supply chains in each case. Here, a track is assigned to each traversing rail for the energy supply chains of the robots mounted on this traversing rail. This means that the energy supply chains belonging to a certain traversing rail run behind one another in the same track.

The disadvantage of such an arrangement is the fact that the energy supply chains of the same traversing rail can collide with one another, as a result of which the movement play of the associated robots is limited.

Accordingly, there is a need for a correspondingly improved robot arrangement.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

The exemplary illustrations comprise the general technical teaching of allowing the energy supply chains which are assigned to the robots on the same traversing rail to run in separate tracks, at least to some extent.

An exemplary robot arrangement likewise has a traversing rail which can be of conventional construction, e.g., allowing a linear movement. Any such traversing rail may be employed that is convenient, e.g., as disclosed in EP 1 609 532 B1 and US Patent Publication No. 2008/0184932 A1, the contents of which are each expressly incorporated by reference in their entireties, and in particular with regard to the design construction of the traversing rail.

Furthermore, an exemplary robot arrangement may have a plurality of robots which can be moved along the traversing rail, so that the traversing rail guides a plurality of robots which can be moved along the traversing rail. The robots may be painting robots and/or handling robots (e.g. bonnet openers, door openers), such as are known for example from the above-mentioned EP 1 609 532 B1, so the content of this publication is to be included in the present description with regard to the function and the design construction of the robots.

The robots may be multi-axial, for example having 3, 4, 5, or 6 movable axes, including the linear axis. Furthermore, the robots may have a multi-axial robot hand axis with 2, 3 or 4 axes. Further, a tool, such as for example an atomiser (e.g. rotary atomiser, air atomiser, airless devices, air-mix devices, ultrasonic atomisers, etc.) or a grip for opening bonnets or doors of motor vehicle bodies may be mounted on the robot hand axis or on a distal robot arm.

Further, an exemplary robot arrangement may also have a plurality of energy supply chains which in each case supply one of the robots and are assigned to this robot, each of the energy supply chains running along the traversing rail in a certain track.

The concept of an energy supply chain used within the scope of the exemplary illustrations should be understood in general terms and not restricted to energy supply chains which guide energy lines, such as electricity lines for example. Rather, exemplary energy supply chains can guide pneumatic, hydraulic and/or electric lines. Energy supply chains of this type can for example be obtained from the German companies Igus GmbH, Kabelschlepp GmbH and Murrplastik Systemtechnik GmbH. The exemplary energy supply chains may be two-dimensional energy supply chains, however, which as such only enable a two-dimensional rolling out movement.

An exemplary robot arrangement stands out on account of the fact that the energy supply chains which are assigned to the robots on the same traversing rail run in separate tracks. Here, there is the option of providing an individual track for each energy supply chain in each case. There is also the option in the context of the exemplary illustrations, however, of providing a plurality of separate tracks for the energy supply chains, which are occupied by one group of energy supply chains in each case. For example, two robots of a traversing rail can share a first track for the energy supply chains, whilst a third robot of the same traversing rail has a separate track for its energy supply chain.

The concept of a track for the energy supply chains used within the scope of the exemplary illustrations should be understood in general terms and may designate an elongated roll-out surface for the respective energy supply chain, that is to say the surface on which the energy supply chain rolls out and then rests by means of its lower side on the roll-out surface.

In one exemplary illustration, at least three robots, to which one energy supply chain is assigned in each case, can be moved on a traversing rail, the energy supply chain of the middle robot on the one hand and the energy supply chains of the two outer robots on the other hand running in separate tracks.

The various tracks for the energy supply chains may be vertically separated. This means that the various tracks run at different heights. For example, one track can be arranged above the traversing rail and another track can be arranged below the traversing rail. Here, the separate tracks may run in a common vertical plane which may also contain the traversing rail, which advantageously enables a small overall width.

In the context of the exemplary illustrations, there is the possibility that the energy supply chains of the same traversing rail are orientated in the same manner in the longitudinal direction. This means that the energy supply chains roll out in the same direction. Alternatively, however, there is also the possibility that the energy supply chains assigned to a particular traversing rail are orientated differently and accordingly roll out in different directions. In the case of an arrangement with three movable robots on one traversing rail, it may for example make sense for the two outer robots to have energy supply chains which are orientated oppositely, whilst the middle robot has an energy supply chain which can be orientated as desired.

Furthermore, there is the possibility in the context of the exemplary illustrations that the energy supply chains are orientated in the same manner in the longitudinal direction and run inside one another. This means that the energy supply chains lie above one another by means of their fixed connection points and then roll out above one another.

In one example, a robot arrangement has a plurality of traversing rails which are arranged above one another and in each case guide a plurality of robots. A robot arrangement of this type is for example known from the above-mentioned EP 1 609 532 B1, so the content of this publication is to be included in the present description in full. For example, two painting robots can be arranged on the upper traversing rail at the outside and a bonnet opener can be arranged in the middle, whilst the lower traversing rail carries a door opener in the middle and two painting robots at the outside.

In an arrangement of this type with a plurality of traversing rails, it is advantageous if at least one of the lower energy supply chains is arranged below the lower traversing rail. This makes sense in particular in the case of a painting installation which has a dry deposition instead of a conventional wet deposition, as then there is sufficient space below the grate of the paint cabin to accommodate an energy supply chain there. In the case of the exemplary illustrations, at least one of the lower energy supply chains may therefore be arranged below a robot operating level, whereby the robot operating level forms a floor and for example can have the previously mentioned grate.

Further, it is advantageous if at least one of the energy supply chains is arranged in a protected manner in a box which extends along the respective traversing rail. A box of this type can be arranged below the lower traversing rail, e.g., also below the robot operating level, as there is sufficient space there if a dry deposition is used instead of a wet deposition.

Furthermore, it is to be mentioned that the robots in the exemplary illustrations may be arranged in an essentially closed cabin, as is known for example from conventional paint cabins in painting installations for motor vehicle body components. The box for the protected accommodation of an energy supply chain may in this case be arranged in such a manner that its inner wall or its outer wall essentially lies in a common plane with the lateral cabin wall. Here, the box for the protected accommodation of the energy supply chain therefore directly adjoins the cabin wall from the inside or from the outside.

Further, in the context of the exemplary illustrations, there is the possibility that at least one of the lower energy supply chains hangs down freely. The lower energy supply chains can therefore hang down into the space below the cabin floor.

To realize a so-called clean wall concept, it may be furthermore advantageous if all energy supply chains, e.g., and also all traversing rails, are arranged outside of the cabin, so that the robots project from the traversing rails inwardly through the cabin wall into the cabin.

Furthermore, it is advantageous if the energy supply chains are accessible from outside of the cabin for maintenance operations and repair operations without the cabin having to be entered by maintenance personnel.

Finally, it must be mentioned that the exemplary illustrations not only comprise the robot arrangement described above, but also protection for a complete paint installation with a robot arrangement of this type.

Other advantageous developments of the exemplary illustrations are explained in more detail below, together with the description of the specific exemplary illustrations illustrated, with reference to the figures.

Figure 1:
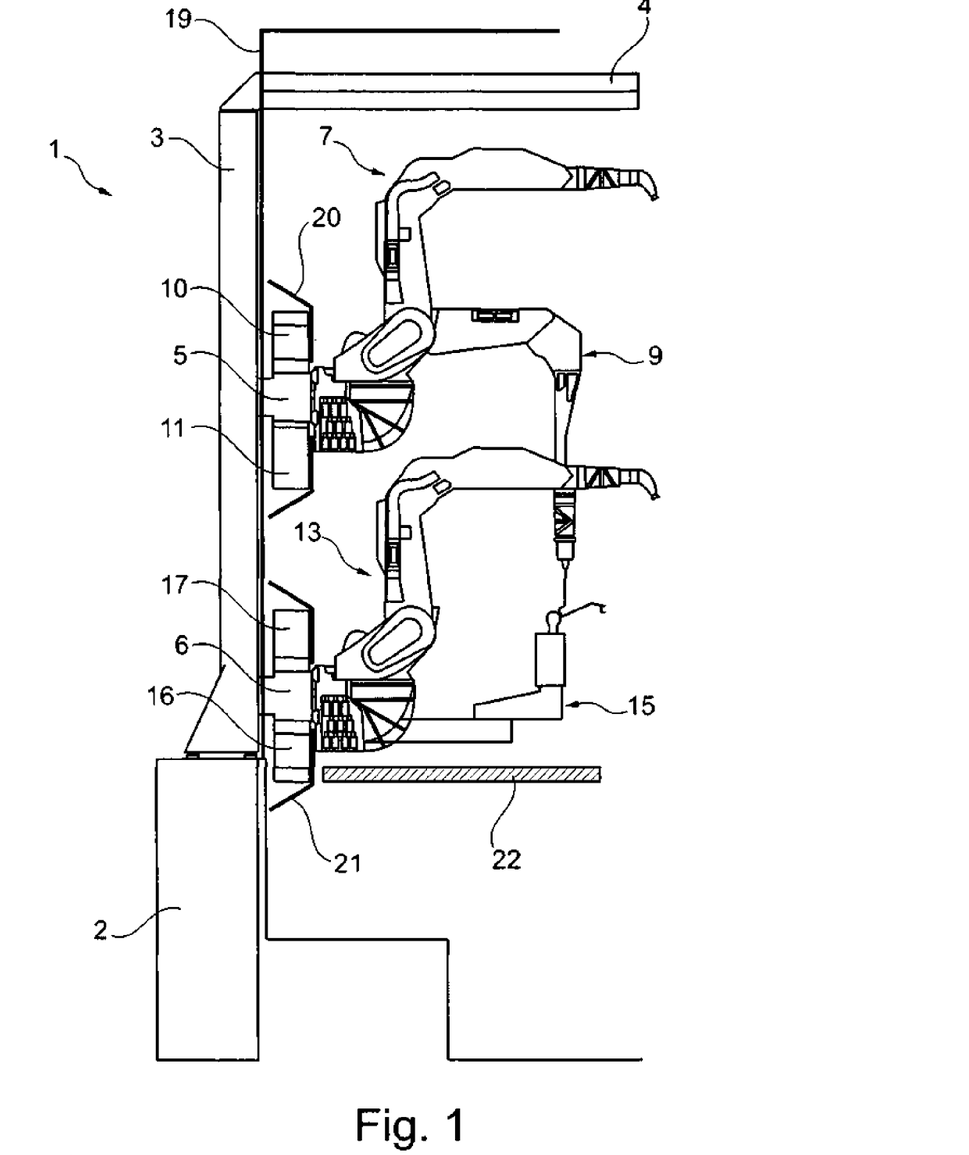
FIG. 1 shows a cross-sectional view of an exemplary paint cabin or booth having two traversing rails arranged above one another for two painting robots and a handling robot in each case.
Figure 3:
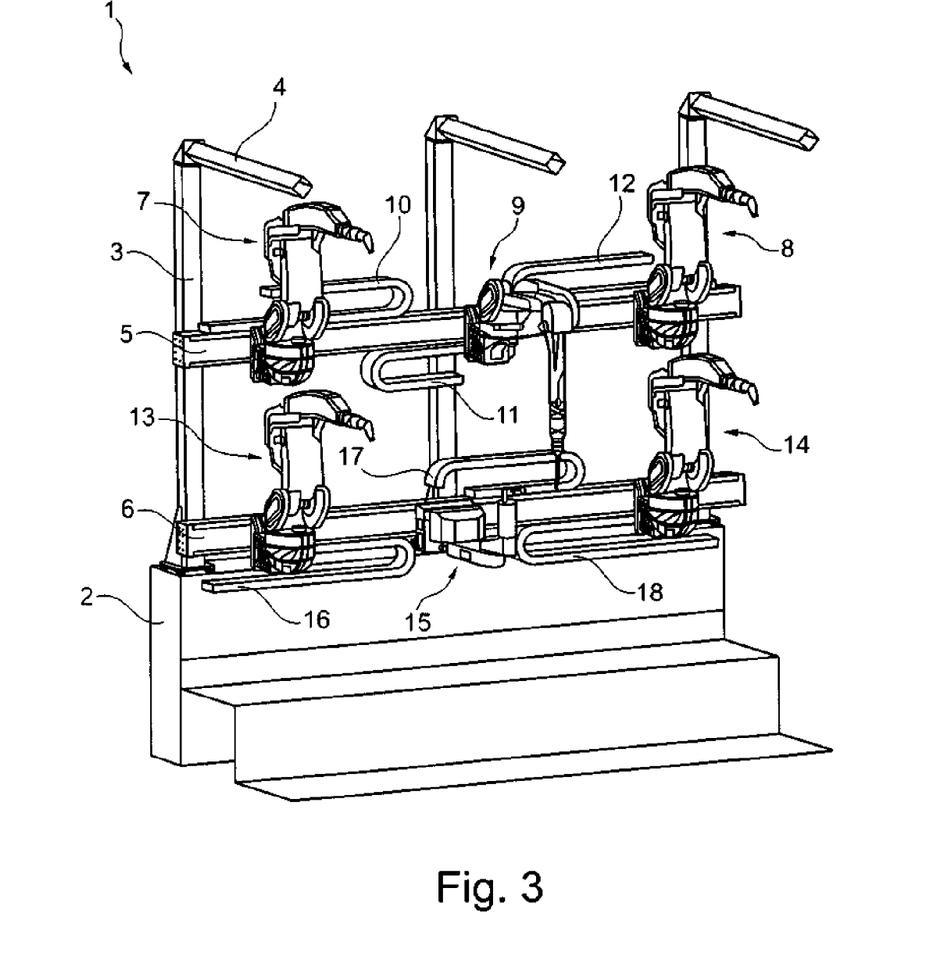
FIG. 3 shows a perspective view of the exemplary paint cabins according to FIG. 1 or FIG. 2.

The FIGS. 1 and 3 show an exemplary paint cabin 1, which is arranged in a painting installation for painting motor vehicle body components along a painting line.

The paint cabin 1 may have a steel beam construction on a foundation 2, with a plurality of vertical beams 3 and one crossbeam 4 in each case, two traversing rails 5, 6 being mounted one above the other on the vertical beams 3.

Two painting robots 7, 8 and one handling robot 9 constructed as a bonnet opener may be attached displaceably on the upper traversing rail 5, the two painting robots 7, 8 being arranged on the outside, whilst the handling robot 9 is located in the centre between the two painting robots 7, 8.

One energy supply chain 10, 11 and 12, respectively, is assigned to each of the painting robots 7, 8 and the handling robot 9, in order to supply the respective painting or handling robot 7, 8 or 9 with the media necessary for operation (e.g. paint, solvent, propellant air, pulsed air, high voltage, etc.).

The energy supply chains 10, 12 of the two outer painting robots 7, 8 are in this case orientated oppositely. So, the energy supply chain 10 of the painting robot 7 rolls out to the right in the drawing according to FIG. 3 and is rolled up to the left. By contrast, the energy supply chain 12 of the painting robot 8 rolls out to the left in the drawing according to FIG. 3 and is rolled up to the right.

The energy supply chain 11 for the centrally arranged handling robot 9 by contrast has the same orientation as the energy supply chain 12 for the painting robot 8.

Furthermore, it is to be mentioned that the energy supply chains 10-12 do not run in a common track, but rather are distributed over various tracks. Thus, the energy supply chains 10, 12 for the two painting robots 7, 8 run in a common track which runs directly above the traversing rail 5. The energy supply chain 11 for the handling robot 9 by contrast runs in a separate track which is arranged directly below the traversing rail 5.

The lower traversing rail 6 likewise carries two painting robots 13, 14 and a handling robot 15 constructed as a door opener, the painting robots 13, 14 also being arranged outside on the lower traversing rail 6, whilst the handling robot 15 is located between the two painting robots 13, 14.

To supply the two painting robots 13, 14 and the handling robot 15, three energy supply chains 16, 17, 18 are provided, the energy supply chains 16, 18 for the painting robots 13, 14 running directly below the traversing rail 6 in a common track, whilst the energy supply chain 17 for the handling robot 15 runs in a separate track which is arranged directly above the lower traversing rail 6.

Furthermore, it is to be mentioned that the outer energy supply chains 16, 18 for the two outer painting robots 13, 14 are orientated differently, as is also the case for the upper energy supply chains 10, 12. The upper energy supply chain 17 of the lower traversing rail 6 is by contrast orientated in the same manner as the energy supply chain 16 for the painting robot 13.

From the cross-sectional view in FIG. 1, it can furthermore be seen that the paint cabin 1 is laterally delimited by a cabin wall 19, the energy supply chains 10-12, 16-18 and also the traversing rails 5, 6 being arranged within the paint cabin 1.

Furthermore, it can be seen from the cross-sectional view that the energy supply chains 10-12 run in a protected manner in a box 20, in order to avoid contaminations.

In the same manner, the energy supply chains 16-18 on the lower traversing rail 6 also run in a box 21, in order to prevent contaminations there also.

Further, it can be seen from the cross-sectional view from FIG. 1 that the two boxes 20, 21 form a common plane with the cabin wall by means of their outer walls.

Finally, a grate 22 can also be seen from the cross-sectional view, below which an overspray deposition is arranged, which is not illustrated for purposes of simplification, however, whereby the overspray deposition can optionally be configured as a dry deposition or as a wet deposition.

Figure 2:
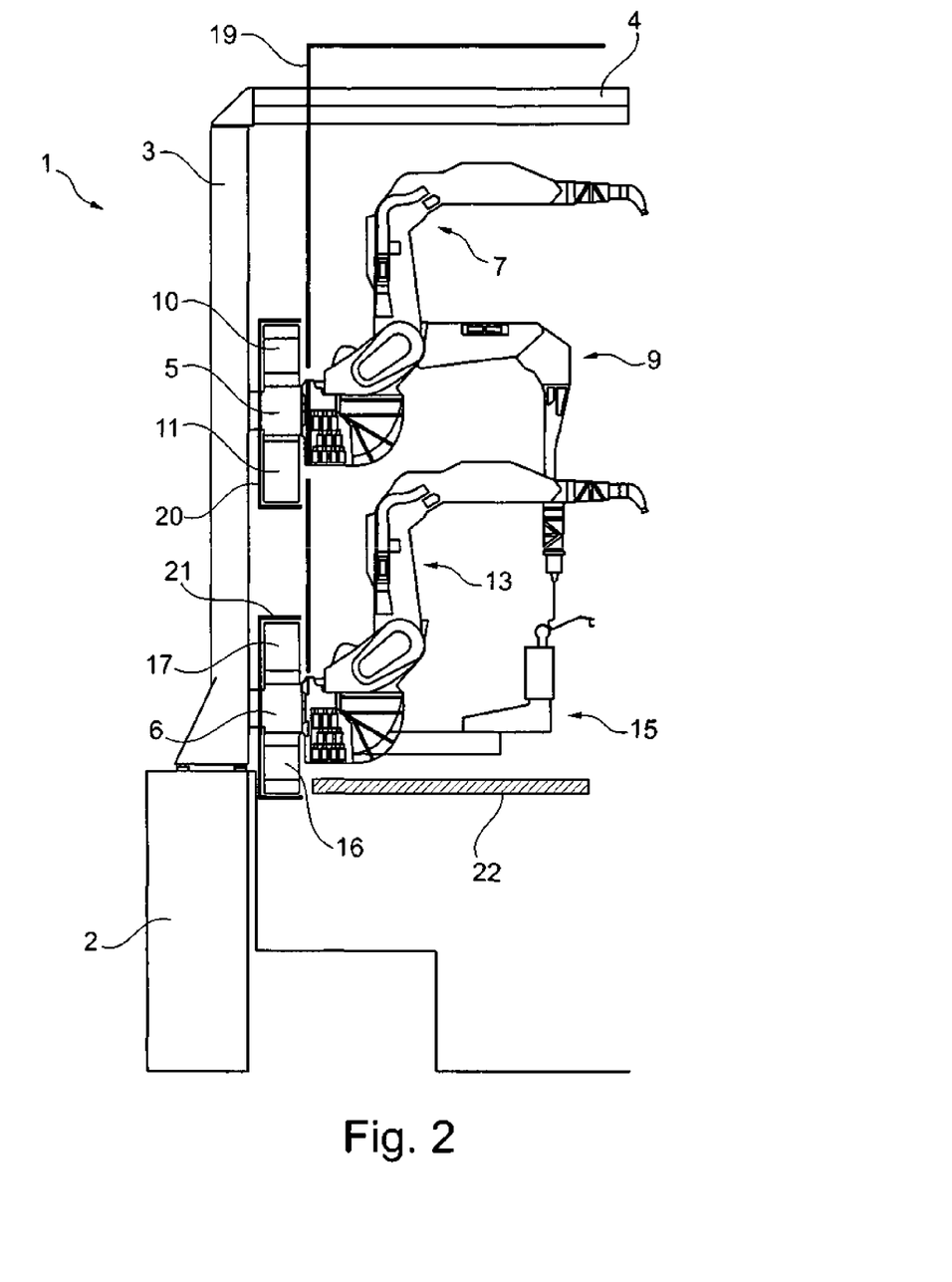
FIG. 2 shows a cross-sectional view of a modification of the exemplary illustration according to FIG. 1.

The exemplary illustration shown in FIG. 2 corresponds extensively with the above-described exemplary illustration, so that in order to avoid repetition, reference is made to the above description, wherein the same reference numerals are used for corresponding details.

One distinctive feature of this exemplary illustration consists in the cabin wall 19 being inwardly offset with respect to the vertical beams 3, whereby the energy supply chains 10-12, 16-18 and the traversing rails 5, 6 are arranged outside of the cabin wall 19. The painting and handling robots 7-9, 13-15 therefore project through openings in the cabin wall 19 into the interior of the paint cabin 1. The boxes 20, 21 for the protected accommodation of the energy supply chains 10-12, 16-18 therefore lie in a common plane with the cabin wall 19 by means of their inner walls.

Figure 4:
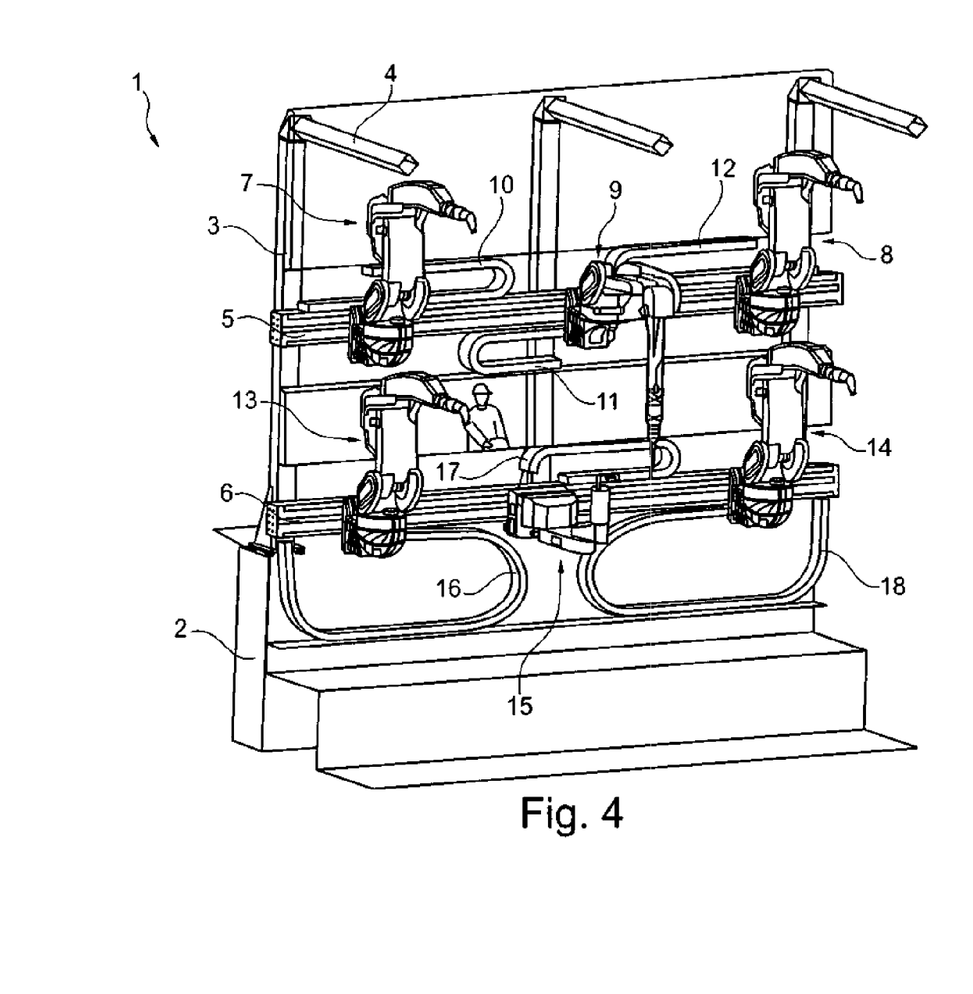
FIG. 4 shows a perspective view of an alternative exemplary illustration of a paint cabin, the energy supply chains hanging on the lower traversing rail down into the space below the grate.

The exemplary illustration as shown in FIG. 4 likewise corresponds extensively with the above-described exemplary illustrations, so that in order to avoid repetition, reference is made to the above description, wherein the same reference numerals are used for corresponding details.

Here, it is to be mentioned that the boxes 20, 21 for the protected accommodation of the lower energy supply chains 16-18 are not illustrated for the sake of simplification. In this exemplary illustration, the boxes 20, 21 are located below the plane of the grate 22 however. This is possible, because in this exemplary illustration, a dry deposition is used, so that there is sufficient space below the grate 22 to accommodate the boxes 20, 21 there.

A further distinctive feature of this exemplary illustration consists in the lower energy supply chains 16, 18 for the two painting robots 13, 14 hang on the lower traversing rail 6 down into the space below the grate 22.

An arrangement of this type is in particular possible because the overspray deposition is not configured as a wet deposition, but rather as a dry deposition, as thus there is sufficient space below the grate 22.

The exemplary illustration as shown in FIG. 5 again corresponds extensively with the above-described exemplary illustrations, so that in order to avoid repetition reference is made to the above description, wherein the same reference numerals are used for corresponding details.

Figure 5:
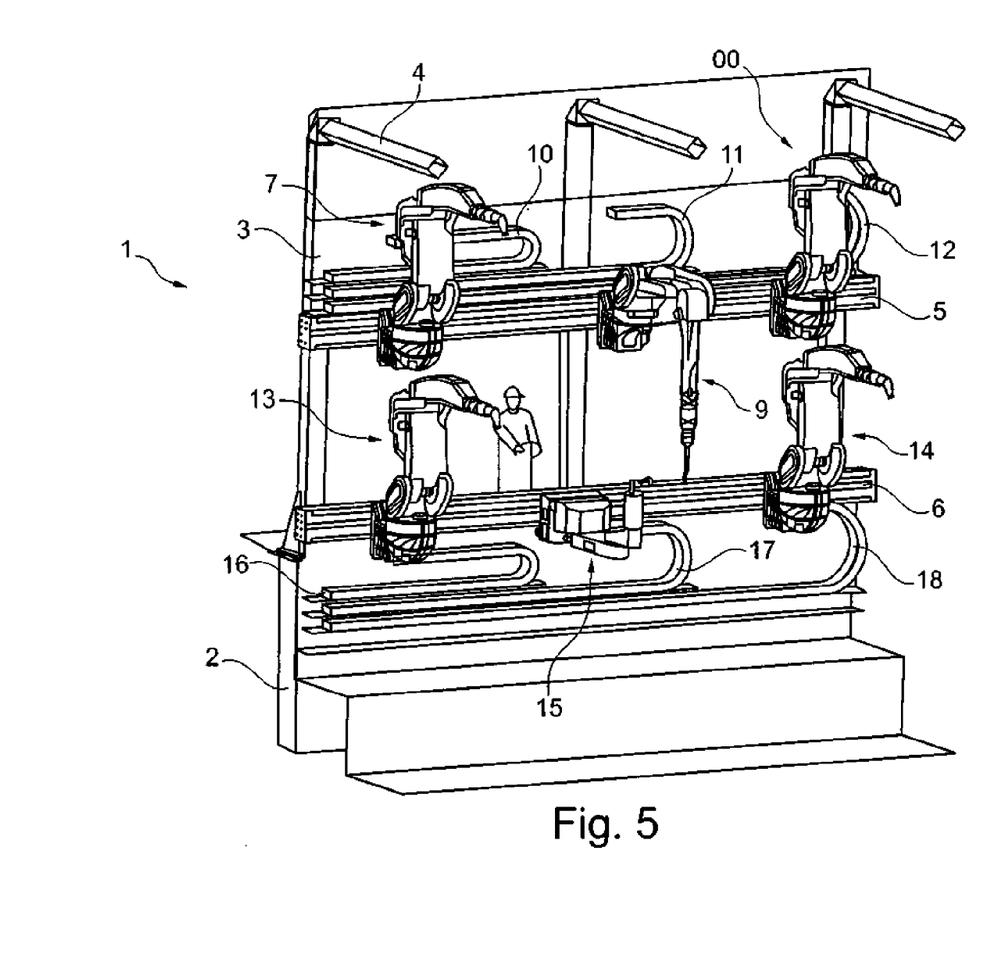
FIG. 5 shows a perspective view of a further exemplary illustration, in which the energy supply chains of the lower traversing rail run inside one another.

A distinctive feature of this example consists in all energy supply chains 10-12, 16-18 running one inside the other and rolling up and rolling out in the same direction.

Figure 6:
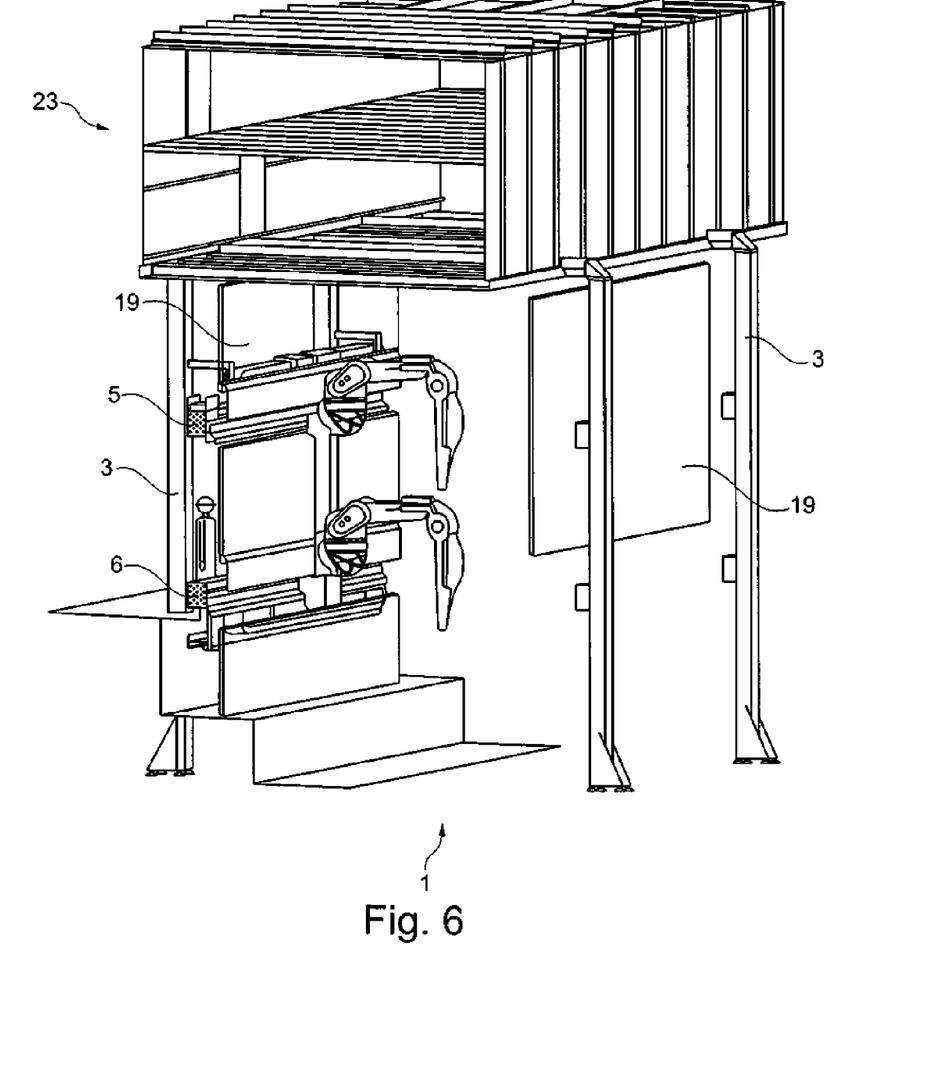
FIGS. 6 and 7 show a perspective view and a cross-sectional view, respectively, of a modification of the exemplary illustrations according to FIGS. 1 and 2, FIGS. 8 and 9 show a perspective view and a cross-sectional view, respectively, of a modification of the exemplary illustrations according to FIGS. 6 and 7, with a downwardly offset lower traversing rail.
Figure 7:
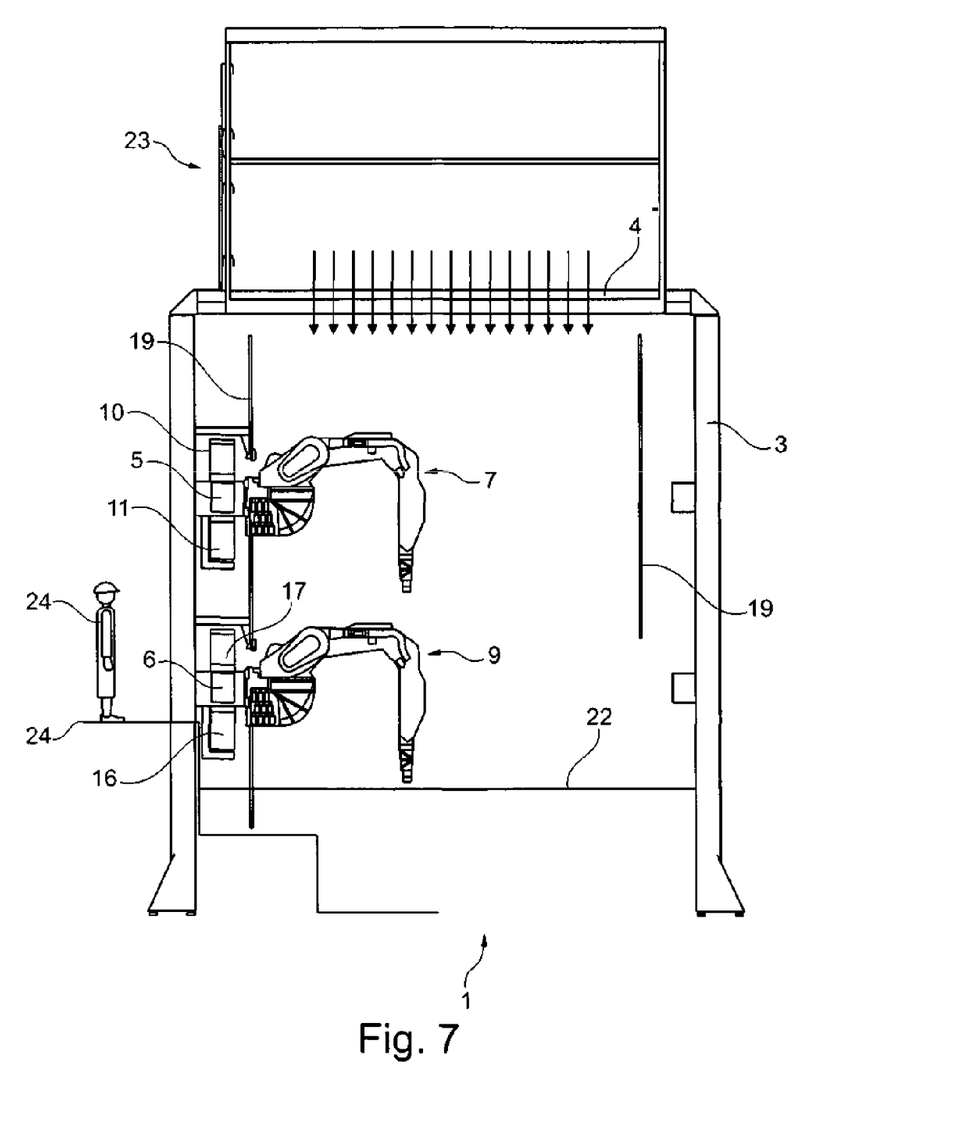

The exemplary illustration in accordance with FIGS. 6 and 7 partially corresponds with the above-described exemplary illustrations, so that to avoid repetition reference is made to the above description with the same reference numbers being used for corresponding details.

It can also be seen from these drawings that a so-called plenum 23 is arranged above the paint cabin 1, the plenum 23 being separated from the paint cabin 1 lying therebelow by means of a filter ceiling. Air from the plenum 23 may be introduced downwardly into the paint cabin 1 through the filter ceiling, as is indicated in FIG. 7 by means of the downwardly directed arrows, the downwardly directed air flow leaving the paint cabin 1 again via the grate 22. The air flow directed downwardly in the paint cabin 1 may be used to remove the so-called overspray from the paint cabin 1 as quickly as possible, e.g., in order to prevent the paint cabin 1 or the components to be coated in the paint cabin 1 from being contaminated by the overspray.

Furthermore, it can be seen from the illustration in FIG. 7 that an operating level 24 is located alongside the paint cabin 1, on which operating level an operator 25 can stand, whereby the operating level 24 is upwardly offset with respect to the grate 22. The cabin wall 19 is here transparent to some extent, so that the operator 25 can see into the paint cabin 1, in order to monitor the painting process visually.

Further, it is to be mentioned with respect to this exemplary illustration that in addition to the crossbeam 4, the plenum 23 brings about a transverse reinforcement of the paint cabin 1.

Furthermore, it is to be noted that the plenum 23 is likewise supported by the vertical beams 3 of the paint cabin 1, so a separate support structure for the plenum can be dispensed with. Furthermore, the supporting function of the plenum 23 allows dispensing with the crossbeam 4.

Figure 8:
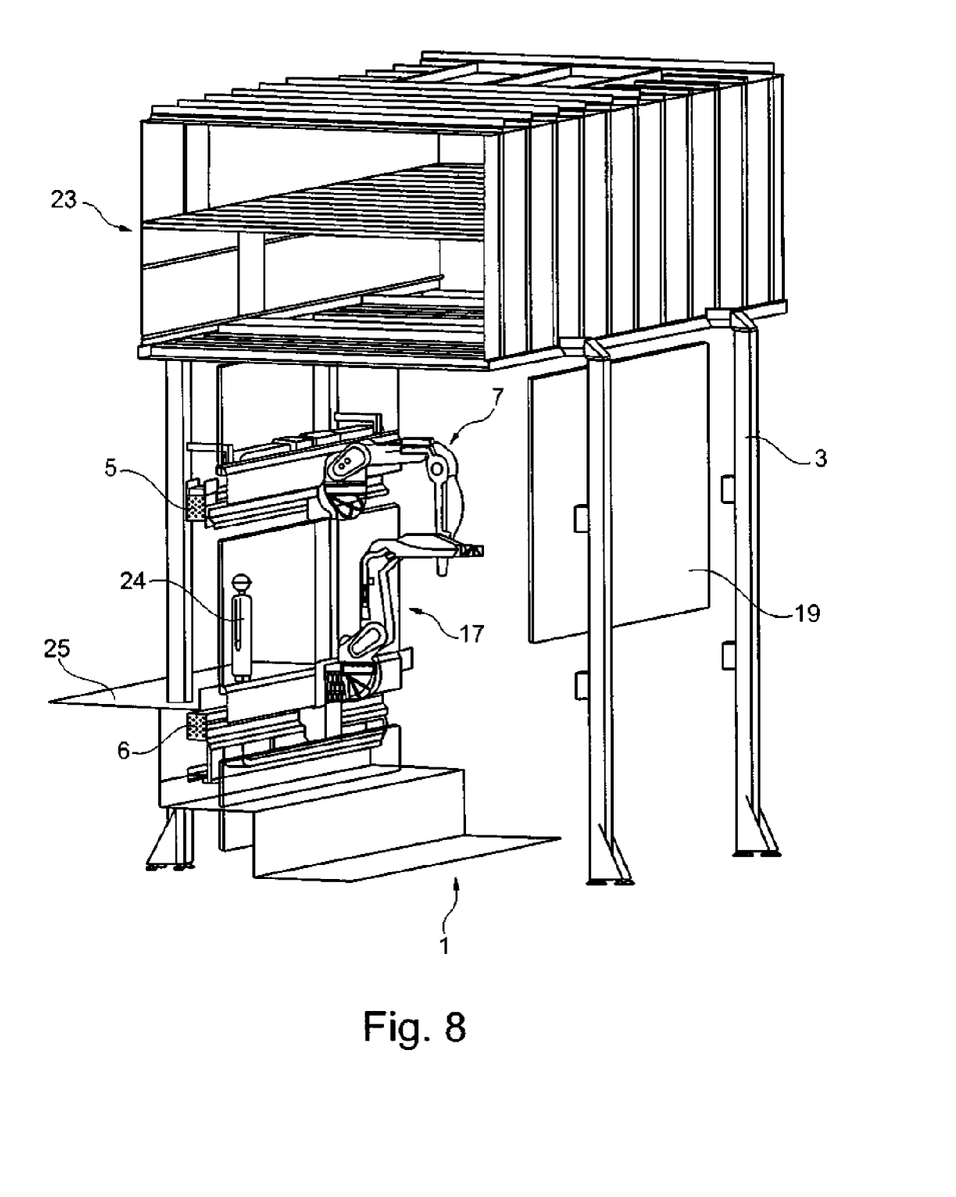
Figure 9:
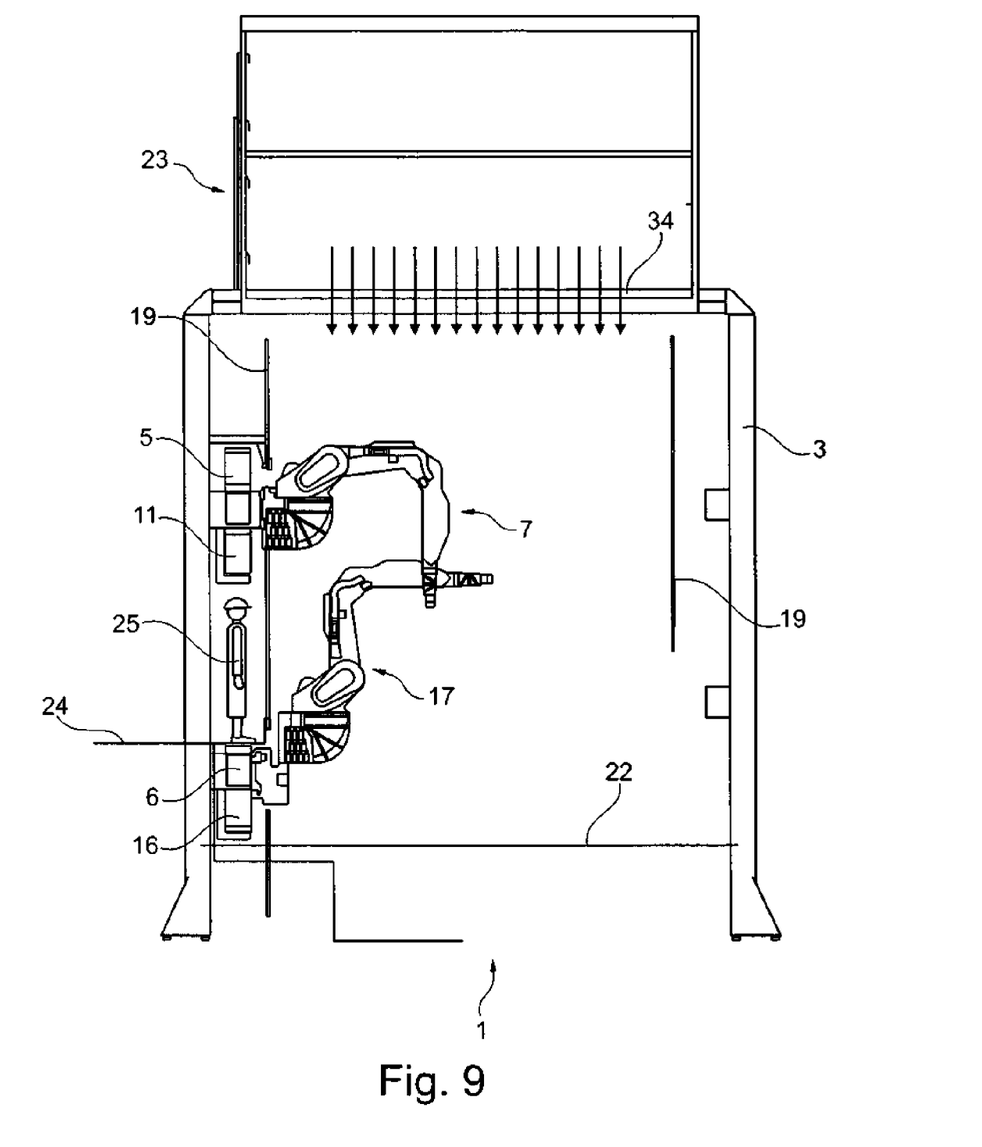

The exemplary illustration in accordance with FIGS. 8 and 9 likewise partially corresponds with the above-described exemplary illustrations, so that to avoid repetition reference is made to the above description with the same reference numbers being used for corresponding details.

One distinctive feature of this exemplary illustration consists in the lower traversing rail 6 being downwardly offset with respect to the operating level 24, so that the lower traversing rail 6 is located below the operating level 24. By means of this arrangement, it is possible to reduce the height difference between the operating level 24 and the grate 22 to 300 mm.

Furthermore, it can be seen in particular from FIG. 9 that the operating level 24 can be accessed as far as directly at the cabin wall 19, as the lower traversing rail 6 is downwardly offset together with the associated energy supply chains 16-18 and is located below the operating level 24.

Further, in this arrangement, there is the possibility that the lower traversing rail 6 together with the associated energy supply chains 16-18 is maintained from below.

In this exemplary illustration, the paint cabin 1 has a clear width of 5000 millimeters (mm), but other cabin widths can also be realized.

Figure 10:
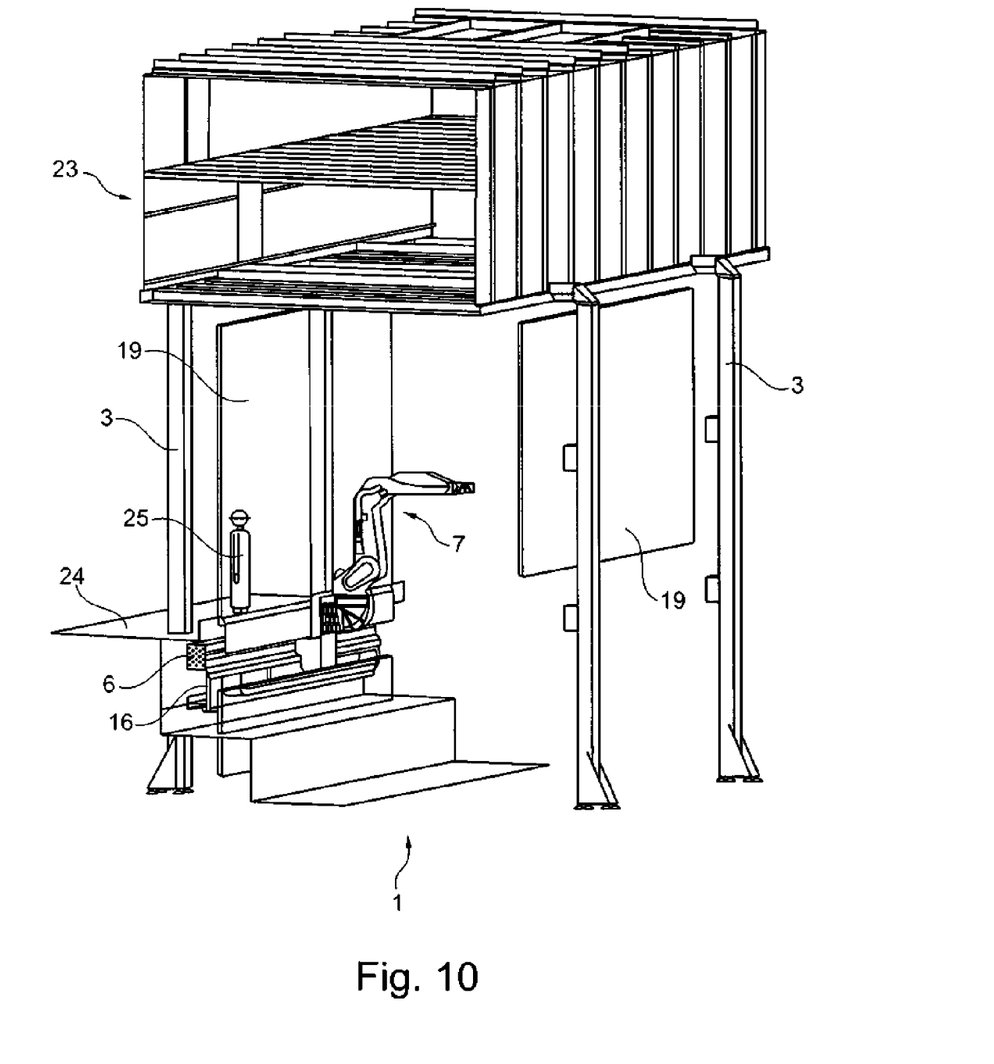
FIGS. 10 and 11 show a perspective view and a cross-sectional view, respectively, of a modification of the exemplary illustrations according to FIGS. 8 and 9 with only one single traversing rail on each side of the paint cabin.
Figure 11:
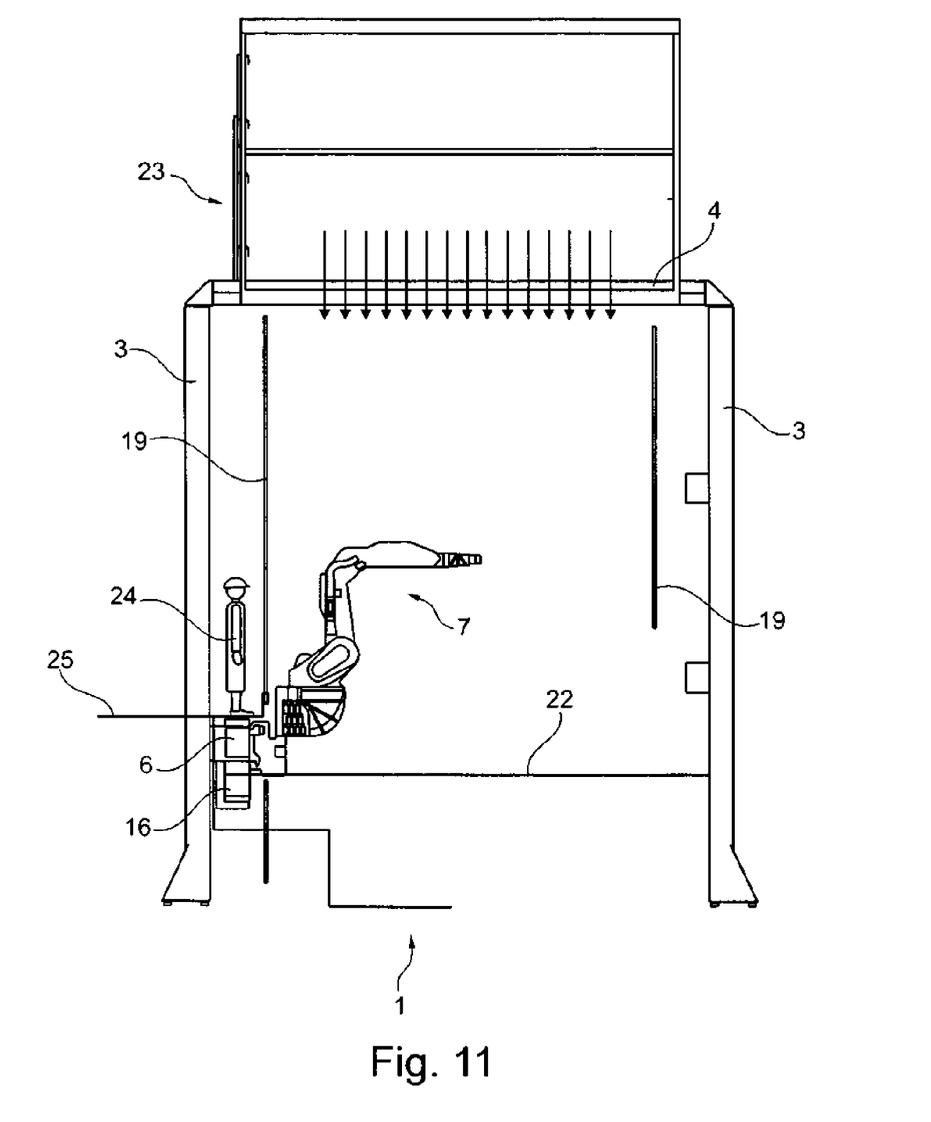

Finally, the exemplary illustration in accordance with FIGS. 10 and 11 also partially corresponds with the above-described exemplary illustrations, so that to avoid repetition reference is made to the above description with the same reference numbers being used for corresponding details.

A distinctive feature of this exemplary illustration consists in the upper traversing rail 5 with the associated painting and handling robots 7-9 and the energy supply chains 10-12 being omitted.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

REFERENCE LIST

1 Paint cabin
2 Foundation
3 Vertical beam
4 Crossbeam
5 Traversing rail
6 Traversing rail
7 Painting robot
8 Painting robot
9 Handling robot
10 Energy supply chain
11 Energy supply chain
12 Energy supply chain
13 Painting robot
14 Painting robot
15 Handling robot
16 Energy supply chain
17 Energy supply chain
18 Energy supply chain
19 Cabin wall
20 Box
21 Box
22 Grate
23 Plenum
24 Operating level
25 Operator

The invention claimed is:

1. Robot arrangement comprising:
a) a traversing rail,
b) a plurality of robots, which can be moved along the traversing rail,
c) a plurality of energy supply chains, each assigned to supply one of the robots,
d) wherein a first one of the energy supply chains is assigned to a first one of the robots and a second one of the energy supply chains is assigned to a second one of the robots, and further wherein the first energy supply chain runs along the traversing rail in a first track that is above the traversing rail and the second energy supply chain runs along the traversing rail in a second track that is separate from the first track and that is below the traversing rail.

2. Robot arrangement according to claim 1, wherein
a) at least three robots can be moved on the traversing rail,
b) one energy supply chain is assigned to each of the three robots, and
c) an energy supply chain of a middle robot runs on a track separate from a track on which run and energy supply chains of two outer robots.

3. Robot arrangement according to claim 1, wherein the tracks for the energy supply chains of the same traversing rail essentially run in a common vertical plane.

4. Robot arrangement according to claim 1, wherein the energy supply chains of the traversing rail are orientated differently in the longitudinal direction, so that the energy supply chains roll out in opposite directions and also roll up in opposite directions.

5. Robot arrangement according claim 4, wherein
a) at least one of the lower energy supply chains is arranged in a protected manner in a box which extends along the lower traversing rail, and
b) the box is arranged below the robot operating level.

6. Robot arrangement according to claim 5, wherein
   a) the robots are arranged in a cabin which is laterally delimited by a cabin wall, and
   b) the outer wall or the inner wall of the box essentially lies in a common plane with the lateral cabin wall.

7. Robot arrangement according to claim 1, wherein tracks for the energy supply chains of the traversing rail run above one another.

8. Robot arrangement according to claim 1, wherein energy supply chains run inside one another.

9. Robot arrangement according to claim 1, further comprising:
   a) an upper traversing rail, on which a plurality of upper robots can be moved,
   b) a plurality of upper energy supply chains for supplying upper robots, wherein one of the upper energy supply chains is assigned to each of the upper robots,
   c) a lower traversing rail, on which a plurality of lower robots can be moved, and
   d) a plurality of lower energy supply chains for supplying the lower robots, wherein one of the lower energy supply chains is assigned to each of the lower robots.

10. Robot arrangement according to claim 9, wherein at least one of the lower energy supply chains is arranged below the lower traversing rail.

11. Robot arrangement according to claim 9, wherein
   a) a robot operating level is provided, which forms a floor and has a grate, and
   b) at least one of the lower energy supply chains is arranged below the robot operating level.

12. Robot arrangement according to claim 1, wherein at least one of the lower energy supply chains hangs down essentially freely.

13. Robot arrangement according to claim 1, wherein
   a) the robots are arranged in a cabin which is laterally delimited by a cabin wall, and
   b) all energy supply chains are arranged outside the cabin wall, and
   c) all traversing rails are arranged outside the cabin wall, so that the robots project from the outer traversing rails inwardly through the cabin wall into the cabin.

14. Robot arrangement according to claim 1, wherein the energy supply chains are accessible from outside of the cabin wall for maintenance operations and repair operations without the cabin having to be entered.

15. Robot arrangement according to claim 1, wherein the robots are painting robots and handling robots.

16. Robot arrangement according to claim 1, wherein the energy supply chains contain the following lines for the respective robots:
   a) a compressed air line,
   b) a coating agent line,
   c) a rinsing agent line,
   d) a power supply line,
   e) a control line.

17. Robot arrangement according to claim 1, wherein the energy supply chains are connected at one end to a fixed connection point and at the other end to the robot assigned in each case, whereby the energy supply chains can roll out therebetween in the manner of a chain.

18. Robot arrangement according to claim 1, wherein
   a) a paint cabin is laterally delimited by a cabin wall,
   b) an operating level is arranged alongside the paint cabin, wherein the operating level is accessible for operators,
   c) the operating level adjoins the cabin wall as much as directly and can be accessed as far as directly in front of the cabin wall, and
   d) the lower traversing rail is located together with the lower energy supply chains below the operating level.

19. Coating apparatus for coating components, with a robot arrangement according to claim 1.

* * * * *

UNITED STATES PATENT AND TRADEMARK OFFICE
CERTIFICATE OF CORRECTION

PATENT NO. : 8,807,073 B2  Page 1 of 1
APPLICATION NO. : 13/254942
DATED : August 19, 2014
INVENTOR(S) : Jürgen Haas et al.

It is certified that error appears in the above-identified patent and that said Letters Patent is hereby corrected as shown below:

In the Claims

1. In column 8, claim 2, in line 53, replace "separate from a track on which run and energy supply" with -- separate from a track on which run energy supply --.

2. In column 8, claim 5, in line 63, replace "Robot arrangement according claim 4, wherein" with -- Robot arrangement according to claim 4, wherein --.

Signed and Sealed this
Twenty-fifth Day of November, 2014

Michelle K. Lee
*Deputy Director of the United States Patent and Trademark Office*